(12) United States Patent
Chen et al.

(10) Patent No.: US 10,797,495 B2
(45) Date of Patent: Oct. 6, 2020

(54) POWER BANK WITH A PLURALITY OF PLUGGABLE BATTERY MODULES

(71) Applicant: Gemtek Technology Co., Ltd., Hsinchu (TW)

(72) Inventors: Hung-Wen Chen, Hsinchu (TW); Wen-Yu Peng, Hsinchu (TW); Chih-Hsu Yen, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 359 days.

(21) Appl. No.: 15/915,085

(22) Filed: Mar. 8, 2018

(65) Prior Publication Data

US 2019/0131808 A1    May 2, 2019

(30) Foreign Application Priority Data

Oct. 27, 2017   (TW) .............................. 106215911 U

(51) Int. Cl.
*H02J 7/00*   (2006.01)
*H01M 10/42*  (2006.01)
*H01M 10/44*  (2006.01)

(52) U.S. Cl.
CPC ....... *H02J 7/0045* (2013.01); *H01M 10/4257* (2013.01); *H01M 10/441* (2013.01); *H01M 2010/4271* (2013.01); *H01M 2220/30* (2013.01); *H02J 7/00* (2013.01); *H02J 7/0013* (2013.01)

(58) Field of Classification Search
CPC .......................... H02J 7/0045; H01M 10/4257
USPC .................................................. 320/107, 112
See application file for complete search history.

(56) References Cited

U.S. PATENT DOCUMENTS

| | | | | |
|---|---|---|---|---|
| 9,882,249 B2 * | 1/2018 | Retti | ................... | H01M 10/465 |
| 9,923,393 B2 * | 3/2018 | Workman | ................. | H02J 7/35 |
| 2012/0281392 A1 * | 11/2012 | Workman | ................. | H02J 7/35 |
| | | | | 362/183 |
| 2016/0380457 A1 * | 12/2016 | Criss | ..................... | H02J 7/0045 |
| | | | | 320/107 |

* cited by examiner

*Primary Examiner* — Richard V Muralidar
(74) *Attorney, Agent, or Firm* — Winston Hsu

(57) ABSTRACT

A power bank has a station and a plurality of battery modules. Each of the battery modules can be positioned in a corresponding slot of the station in a pluggable way and is electrically connected to a charging-discharging control circuit of the station. When a main charging port of the station is electrically connected to a power supply, the charging-discharging control circuit receives electric power from the power supply via the main charging port and uses the received electric power to charge rechargeable batteries of the battery modules. When a main discharging port of the station is electrically connected to an electronic apparatus, the charging-discharging control circuit receives electric power from the rechargeable batteries of the battery modules so as to provide electric power to the electronic apparatus.

6 Claims, 13 Drawing Sheets

POWER BANK WITH A PLURALITY OF PLUGGABLE BATTERY MODULES

BACKGROUND OF THE INVENTION

1. Field of the Invention

The present invention relates to a power bank, and more particularly, to a power bank with a plurality of pluggable battery modules.

2. Description of the Prior Art

A wide variety of modern portable electronic devices, such as laptops, tablets, mobile phones, MP3 players and the like, rely on batteries to provide electric power when used outdoors. Therefore, the user must charge the battery of the portable electronic device before going out and needs to carry multiple batteries for prolonged usage, thus it is very inconvenient. In order to solve this problem, power banks are used. Once the user finishes charging the power bank, the power bank can be used to charge the portable electronic device when the user goes out. However, a current rated capacity of a power bank is mostly fixed, and the user cannot change the rated capacity of the power bank. When a user only briefly walks out but only has a power bank with a large capacity, the large-capacity power bank has a relatively heavy weight and thus causes inconvenience to the user.

SUMMARY OF THE INVENTION

An embodiment of the present invention provides a power bank comprising a station and a plurality of battery modules. The station comprises a first housing, a charging-discharging control circuit, a main charging port, a main discharging port, and a plurality of first charging-discharging ports. The first housing has a base and a plurality of slots. The main charging port and the main discharging port are positioned in the base and electrically connected to the charging-discharging control circuit. The first charging-discharging ports are electrically connected to the charging-discharging control circuit, and each of the first charging-discharging ports is positioned in a corresponding slot. Each of the battery modules is removably positioned in a corresponding slot and comprises a second housing, a rechargeable battery and a second charging-discharging port. The rechargeable battery is positioned in the second housing. The second charging-discharging port is positioned at one side of the second housing and electrically connected to the rechargeable battery. When the battery modules are positioned in the slots, the second charging-discharging port of each battery module is electrically connected to a corresponding first charging-discharging port, and the battery modules are electrically connected in parallel. When the main charging port is electrically connected to a power supply, the charging-discharging control circuit receives electric power from the power supply via the main charging port and charges rechargeable batteries of the battery modules via the first charging-discharging ports of the station and second charging-discharging ports of the battery modules. When the main discharging port is electrically connected to an electronic apparatus, the charging-discharging control circuit provides electric power to the electronic apparatus via the main discharging port.

Another embodiment of the present invention provides another power bank. The power bank comprises a cylindrical housing, a control circuit, a rechargeable battery, a charging port and a discharging port. The control circuit is positioned in the cylindrical housing, and configured to control operations of the power bank. The rechargeable battery is positioned in the cylindrical housing and electrically connected to the control circuit. The charging port is exposed from a first opening of the cylindrical housing and electrically connected to the control circuit. When the charging port is electrically connected to a power supply, the control circuit utilizes electric power of the power supply to charge the rechargeable battery. The discharging port is exposed from a second opening of the cylindrical housing and electrically connected to the control circuit. When the discharging port is electrically connected to an electronic apparatus, the control circuit provides electric power received from the rechargeable battery to the electronic apparatus via the discharging port.

Since each of the battery modules is disposed in a corresponding slot of the station of the power bank in a pluggable manner, a user may dispose an appropriate number of battery modules in the slots of the station of the power bank as required. As a result, users will be more flexible and convenient in using the power bank.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
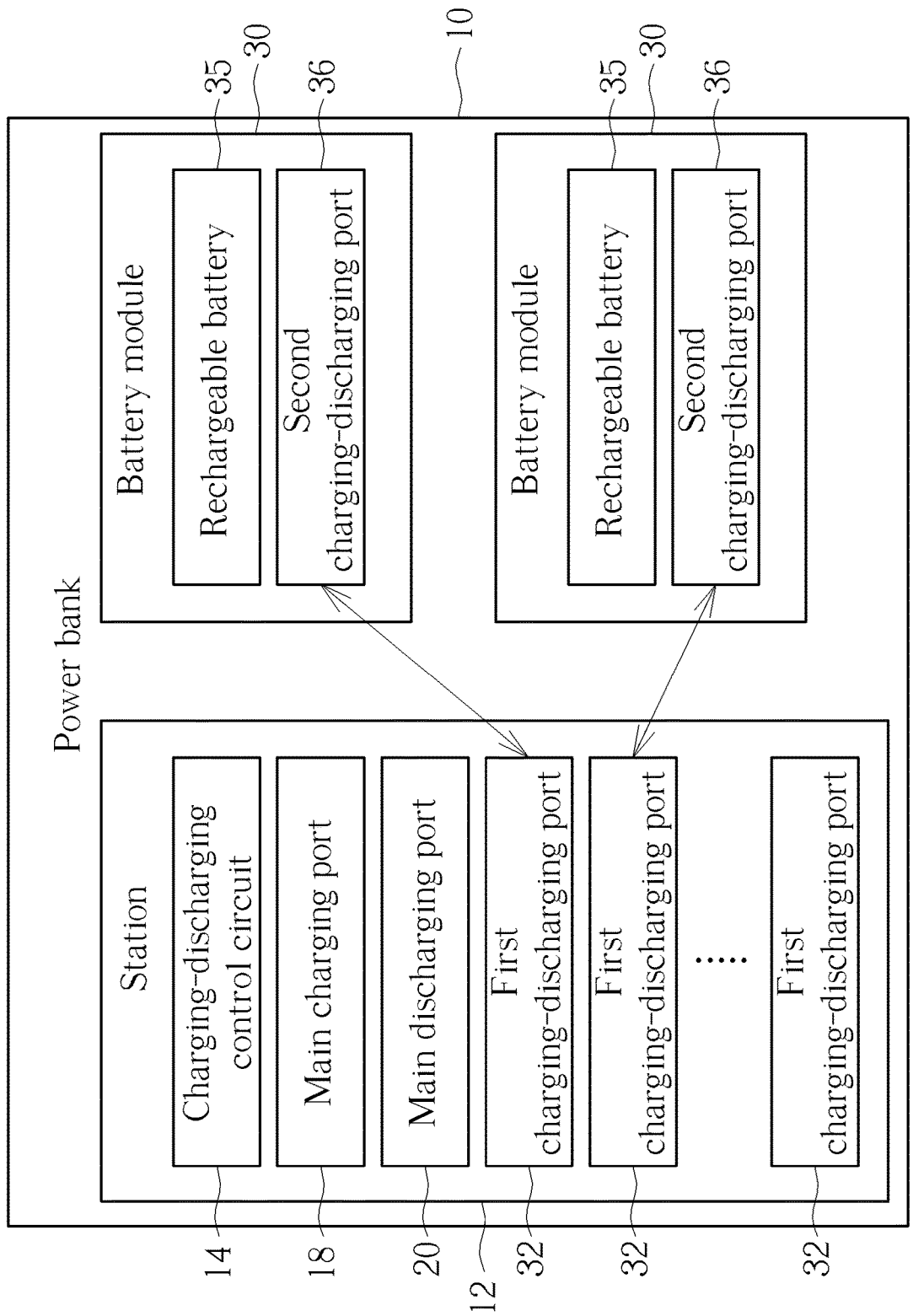
FIG. 1 is a functional block diagram of a power bank according to an embodiment of the present invention.

Please refer to FIG. 1. FIG. 1 is a functional block diagram of a power bank 10 according to an embodiment of the present invention. The power bank 10 has a station 12 and a plurality of battery modules 30 for storing electric energy. The station 12 is used to dispose the battery modules 30 and to control charging/discharging operations of the battery modules 30. The station 12 includes a charging-discharging control circuit 14, a main charging port 18, a main discharging port 20 and a plurality of first charging-discharging ports 32. The charging port 18, the main discharging port 20 and the first charging-discharging ports 32 are all electrically connected to the charging-discharging control circuit 14. In addition, each of the battery modules 30 has a rechargeable battery 35 and a second charging-discharging port 36. The second charging-discharging port 36 is electrically connected to the rechargeable battery 35. When any one of the battery modules 30 is disposed in the station 12, the second charging-discharging port 36 of the battery module 30 is electrically connected to a corresponding first charging-discharging port 32 of the station 12. Therefore, the charging-discharging control circuit 14 of the station 12 can charge and discharge the rechargeable battery 35 of the battery module 30 through the corresponding first charging-discharging port 32 and the second charging-discharging port 36 of the battery module 30.

Figure 2:
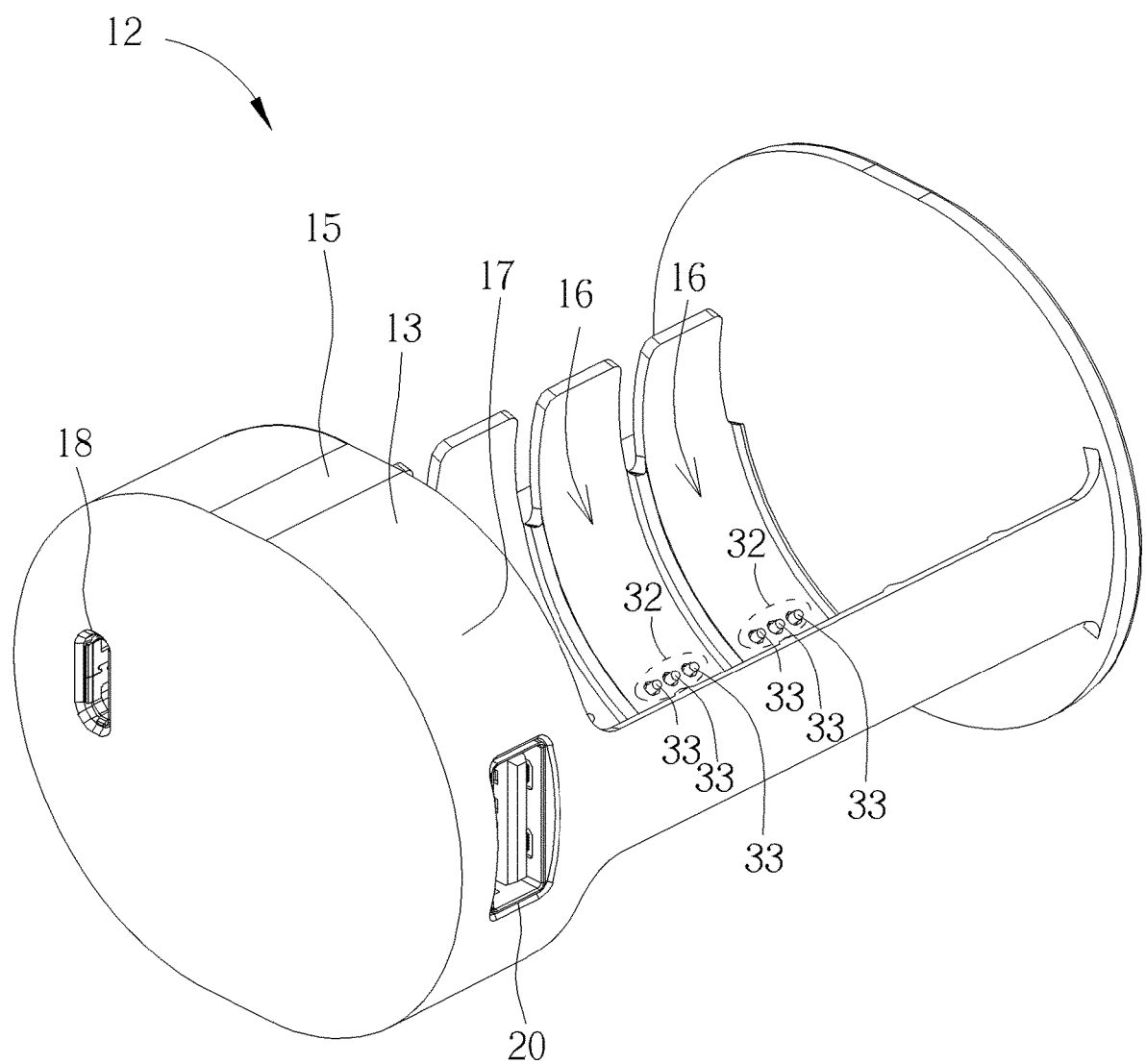
FIG. 2 is a perspective view of the station of the power bank shown in FIG. 1.
Figure 3:
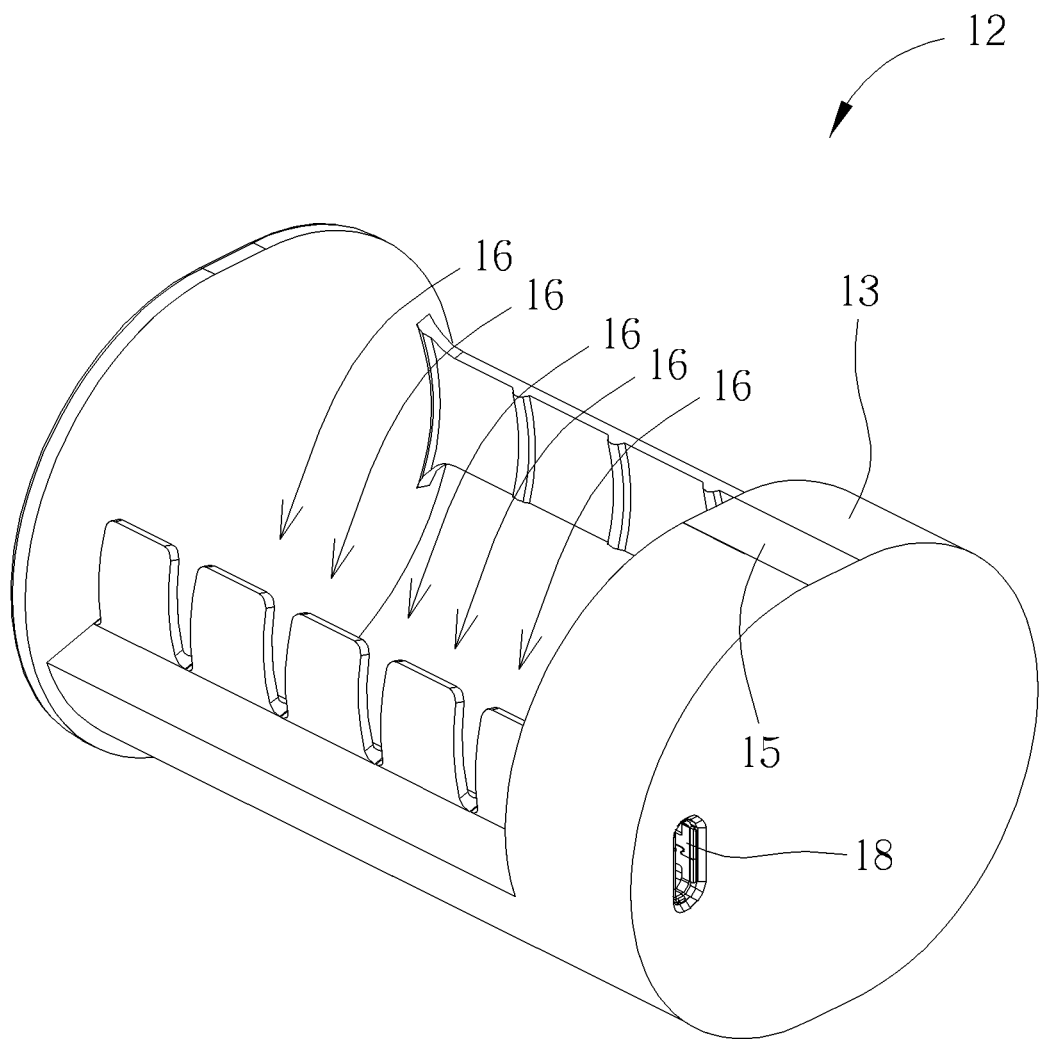
FIG. 3 is another perspective view of the station of the power bank shown in FIG. 1.
Figure 4:
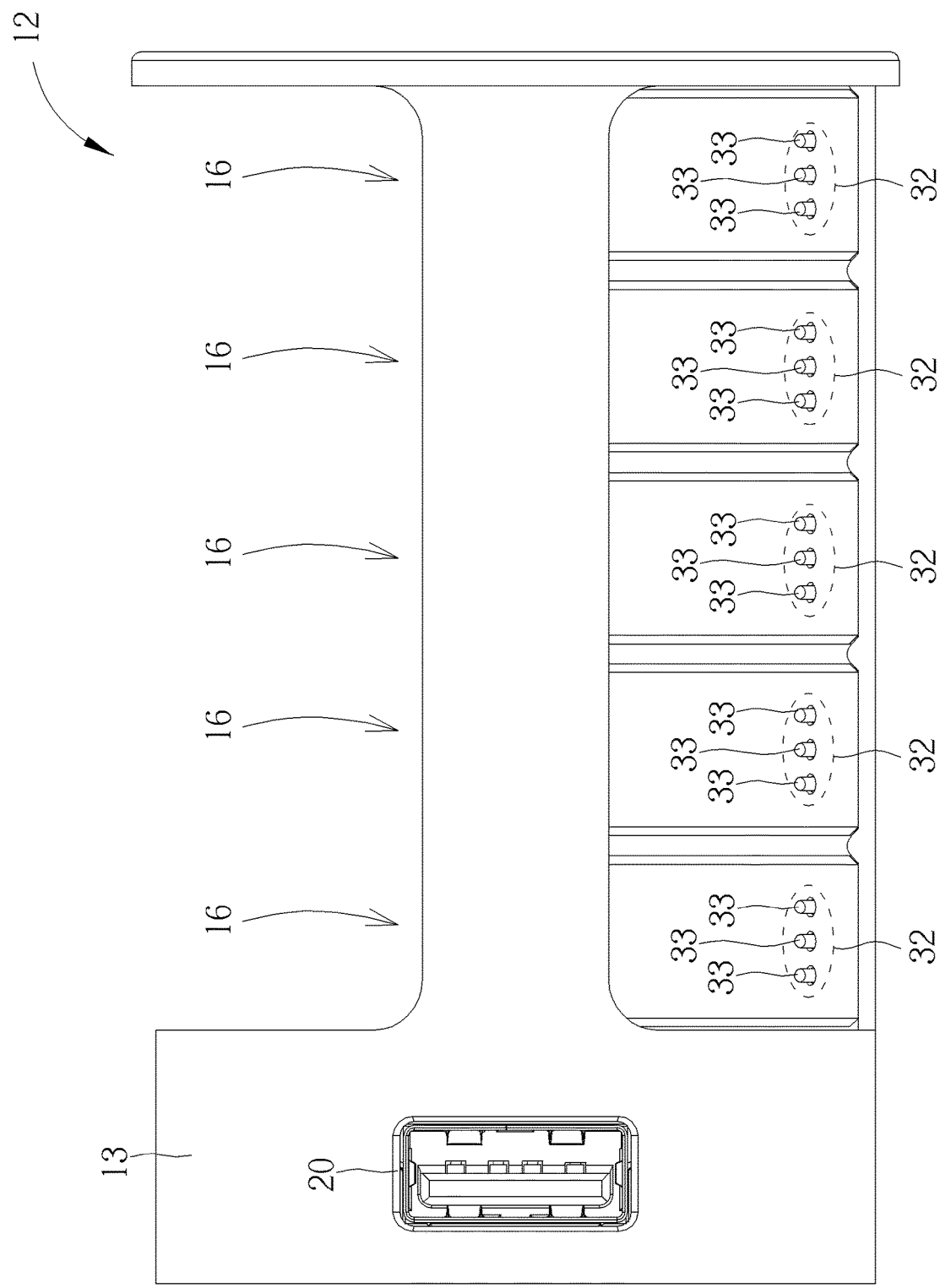
FIG. 4 is a side view of the station of the power bank shown in FIG. 1.

Please refer to FIG. 1 to FIG. 4. FIG. 2 is a perspective view of the station 12 of the power bank shown 10 in FIG. 1. FIG. 3 is another perspective view of the station 12 of the power bank 10 shown in FIG. 1. FIG. 4 is a side view of the station 12 of the power bank 10 shown in FIG. 1. A housing 13 of the station 12 has a base 17 and a plurality of slots 16. The main charging port 18 and the main discharging port 20 are positioned in the base 17. The housing 13 is provided with an opening to expose the main charging port 18 and the main discharging port 20. Each of the slots 16 is configured to dispose a battery module 30, and there is a first charging-discharging port 32 disposed in each slot 16. When a battery module 30 is disposed in the corresponding slot 16, the second charging-discharging port 36 of the battery module 30 is electrically connected to the first charging-discharging port 32 disposed in the corresponding slot 16. In the embodiment, the total number of the slots 16 is five, so that five battery modules 30 can be disposed on the station 12. However, the present invention is not limited thereto. The number of the slots 16 in the station 12 can be increased or decreased according to the design requirements of different products. In addition, in the embodiment, each of the first charging-discharging ports 32 may have three pogo pins 33, which are respectively used as a positive voltage terminal, a negative voltage terminal, and a ground terminal.

Figure 5:
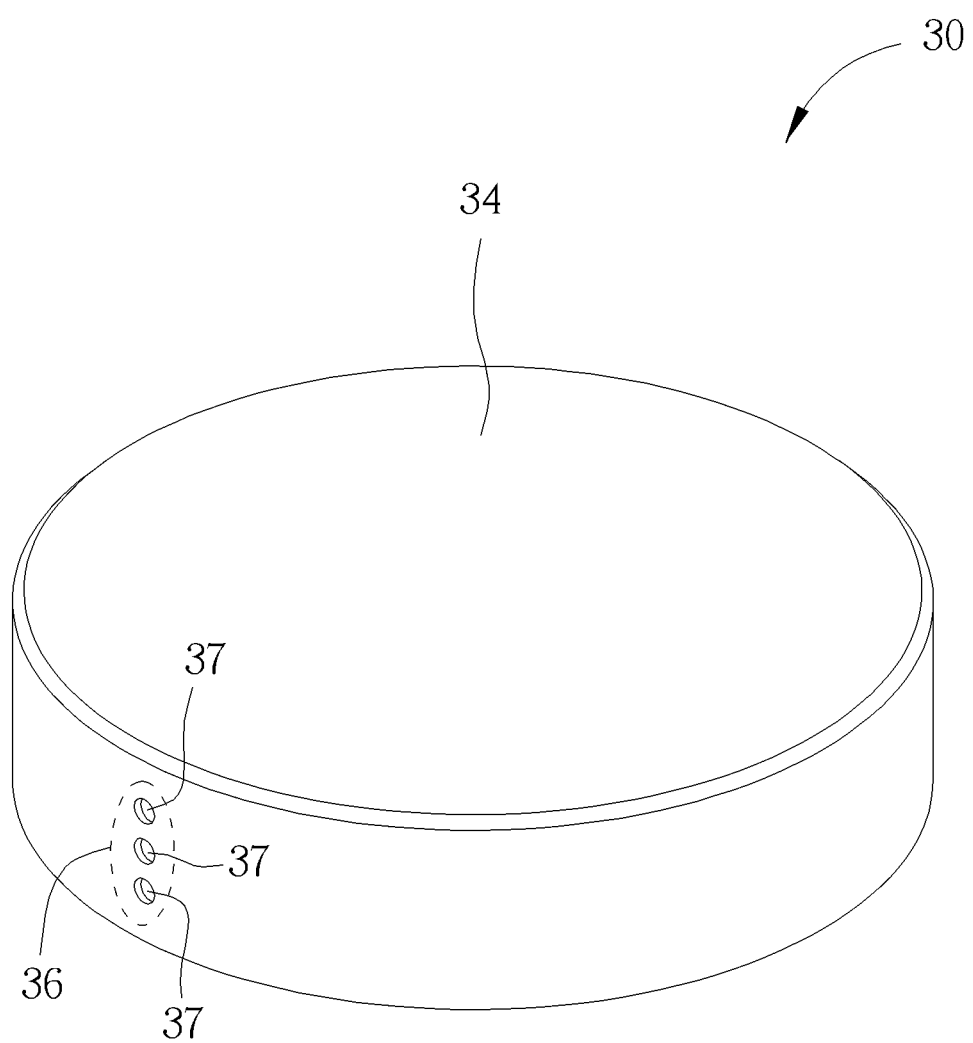
FIG. 5 is a perspective view of the battery module of the power bank shown in FIG. 1.

Please refer to FIG. 1 and FIG. 5. FIG. 5 is a perspective view of the battery module 30 of the power bank 10 shown in FIG. 1. The battery module 30 further has a housing 34. The rechargeable battery 35 is disposed in the housing 34. An opening is provided on one side of the housing 34 to expose the second charging-discharging port 36. In the present embodiment, the housing 34 is a cylindrical housing, but the present invention is not limited thereto. The outer shape of the housing 34 just needs to be matched with the slot 16, so that the battery module 30 can be disposed in the slot 16. In addition, in the embodiment, each of the second charging-discharging ports 36 may have conductive pads 37. Each of the conductive pads 37 is electrically connected to one of the pogo pins 33 of the first charging-discharging port 32. In another embodiment of the present invention, each of the first charging-discharging ports 32 and each of the second charging-discharging ports 36 may be a universal serial bus (USB) port. Each battery module 30 may have a rated capacity of 300 mAh (milliampere hours) to 500 mAh, but the present invention is not limited thereto. The rated capacity of each battery module 30 of the power bank 10 can be reduced or increased according to different usage requirements.

Figure 6:
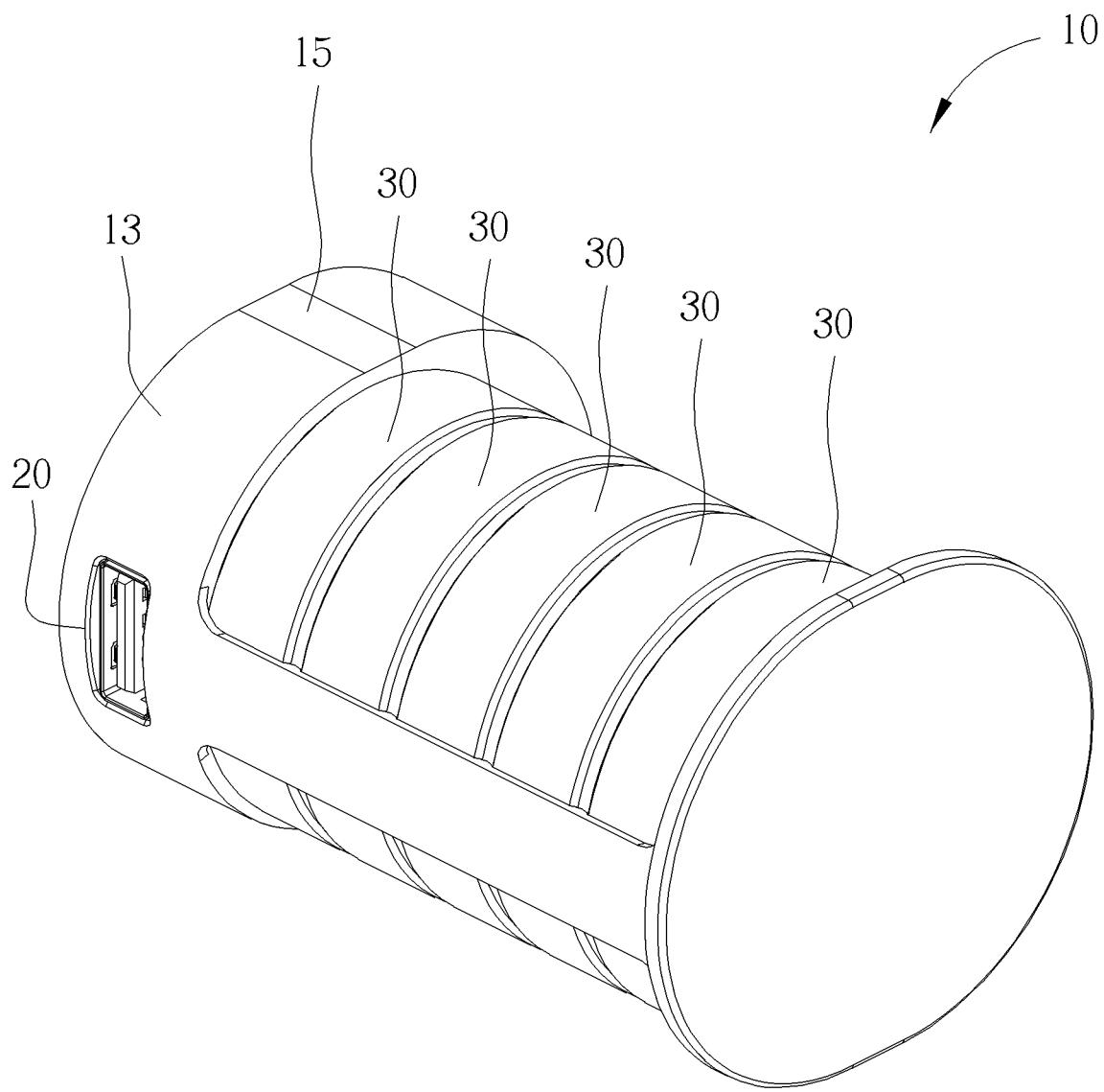
FIG. 6 is a perspective view of the power bank shown in FIG. 1.
Figure 7:
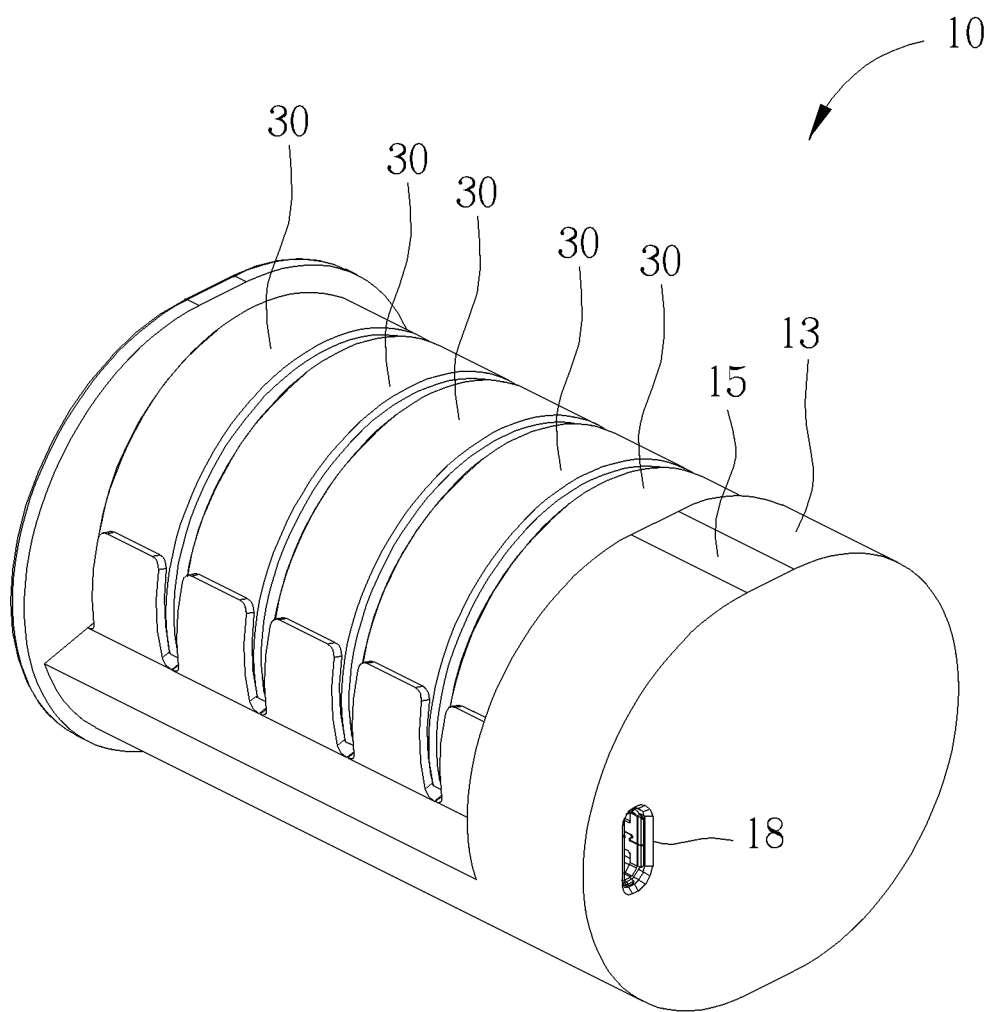
FIG. 7 is another perspective view of the power bank shown in FIG. 1.
Figure 8:
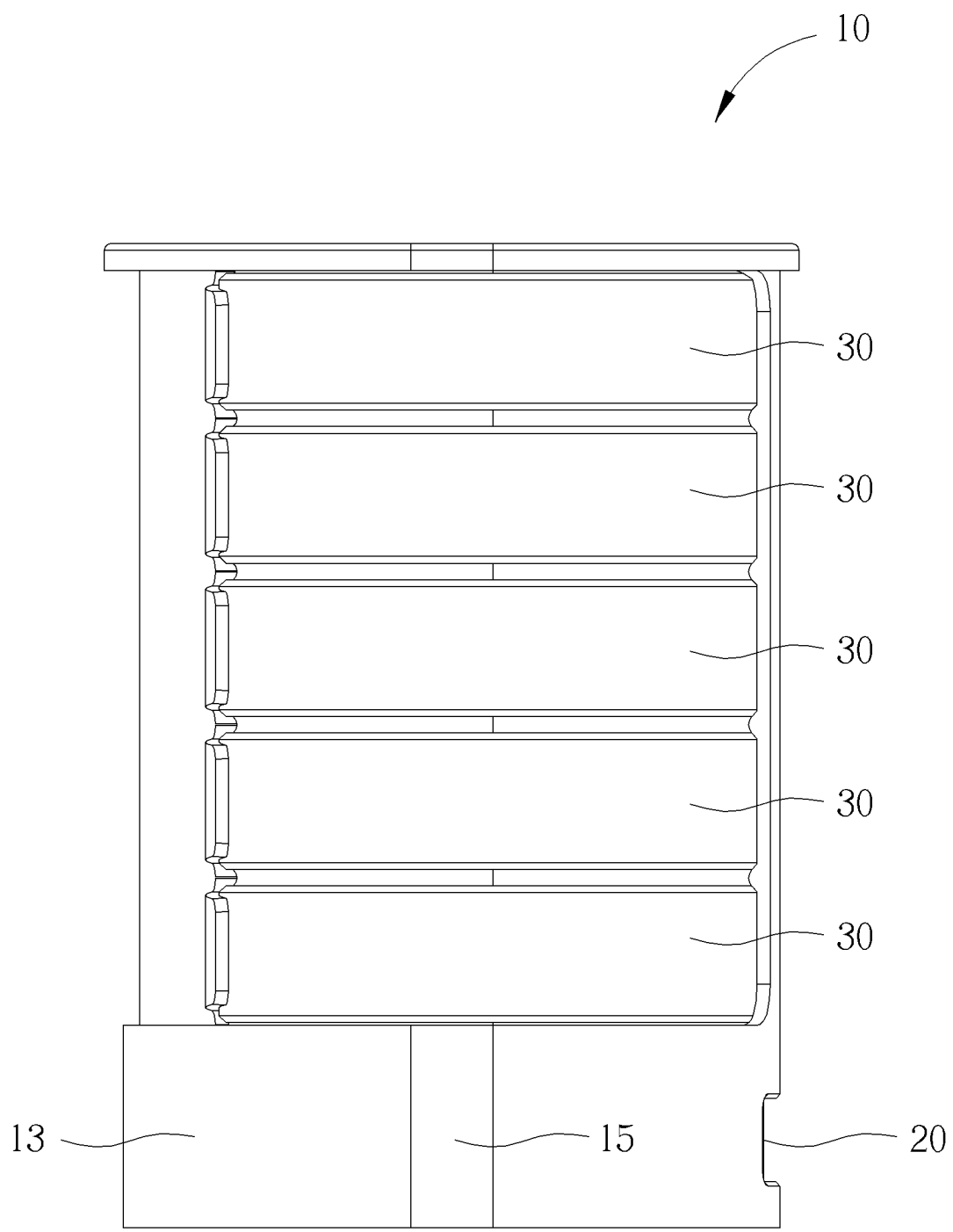
FIG. 8 is a side view of the power bank in FIG. 1.

Please refer to FIG. 1 and FIG. 6 to FIG. 8. FIG. 6 is a perspective view of the power bank 10 shown in FIG. 1. FIG. 7 is another perspective view of the power bank 10 shown in FIG. 1. FIG. 8 is a side view of the power bank 10 in FIG. 1. When each of the slots 16 disposes a battery module 30 therein, schematic diagrams of the power bank 10 are as shown in FIG. 6 and FIG. 7. When a plurality of battery modules 30 are disposed in the slots 16, the second charging-discharging port 36 of each battery module 30 is electrically connected to a corresponding first charging-discharging port 32, and the battery modules 30 are electrically connected in parallel. When the main charging port 18 is electrically connected to a power supply, the charging-discharging control circuit 14 receives electric power from the power supply via the main charging port 18 and charges the rechargeable batteries 35 of the battery modules 30 via the first charging-discharging ports 32 and the second charging-discharging ports 36. In addition, when the main discharging port 20 is electrically connected to an external electronic apparatus (e.g., a mobile phone), the charging-discharging control circuit 14 provides electric power to the external electronic apparatus through the main discharging port 20. Further, if the main charging port 18 is not electrically connected to the power supply, when the main discharging port 20 is electrically connected to an external electronic apparatus, the charging-discharging control circuit 14 can receive electric power from the battery modules 30 via the first charging-discharging ports 32 and the second charging-discharging ports 36 and supply the received electric power to the external electronic apparatus through the main discharging port 20. In addition, if the main charging port 18 is electrically connected to an external power supply, when the main discharging port 20 is electrically connected to an external electronic apparatus, the charging-discharging control circuit 14 directly transfers electric power received from the external power supply to the external electronic apparatus via the main charging port 18 and the main discharging port 20.

In addition, the embodiment shown in FIG. 6 to FIG. 8 is explained with each slot 16 disposing a battery module 30 therein. However, it is noted that the power bank 10 can provide electric power as long as one of the battery modules 30 is disposed in one of the slots 16. In addition, when a plurality of battery modules 30 are disposed in the slots 16, since the battery modules 30 are electrically connected in parallel, the power bank 10 still provides a stable voltage even if the number of the battery modules 30 disposed in the slots 16 may be changed.

Figure 9:
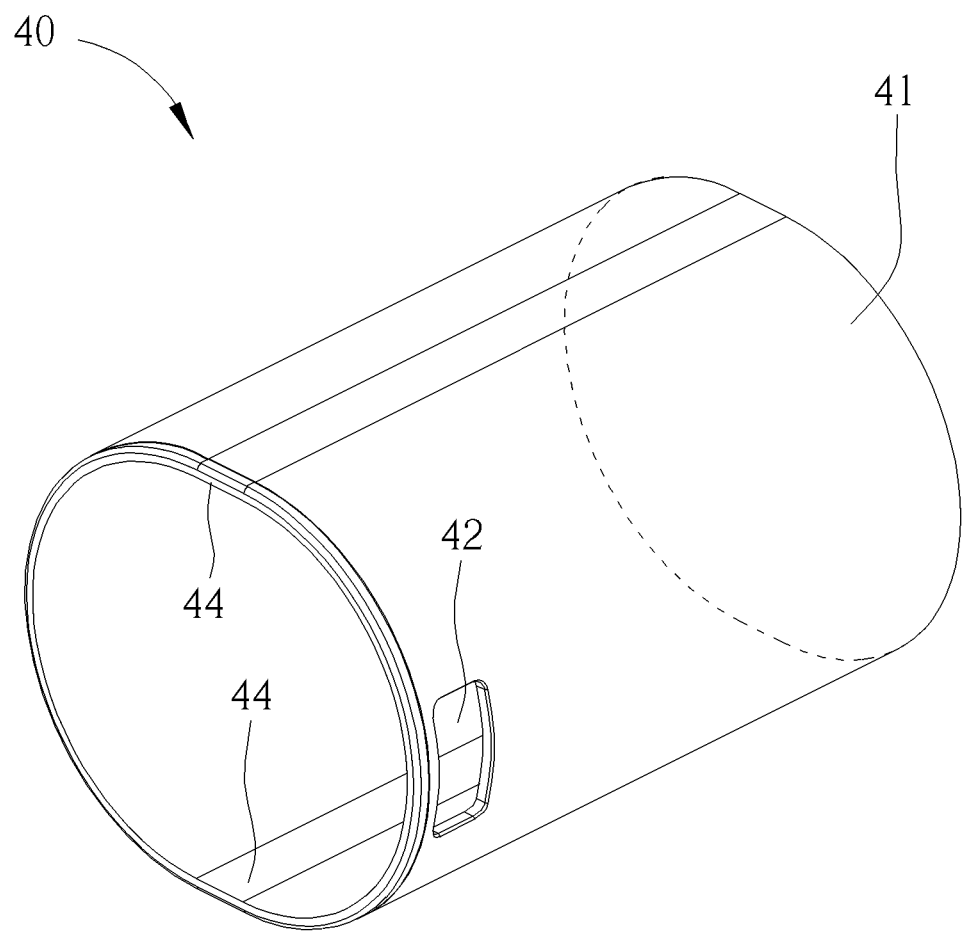
FIG. 9 is a perspective view of a housing of the power bank shown in FIG. 1.
Figure 10:
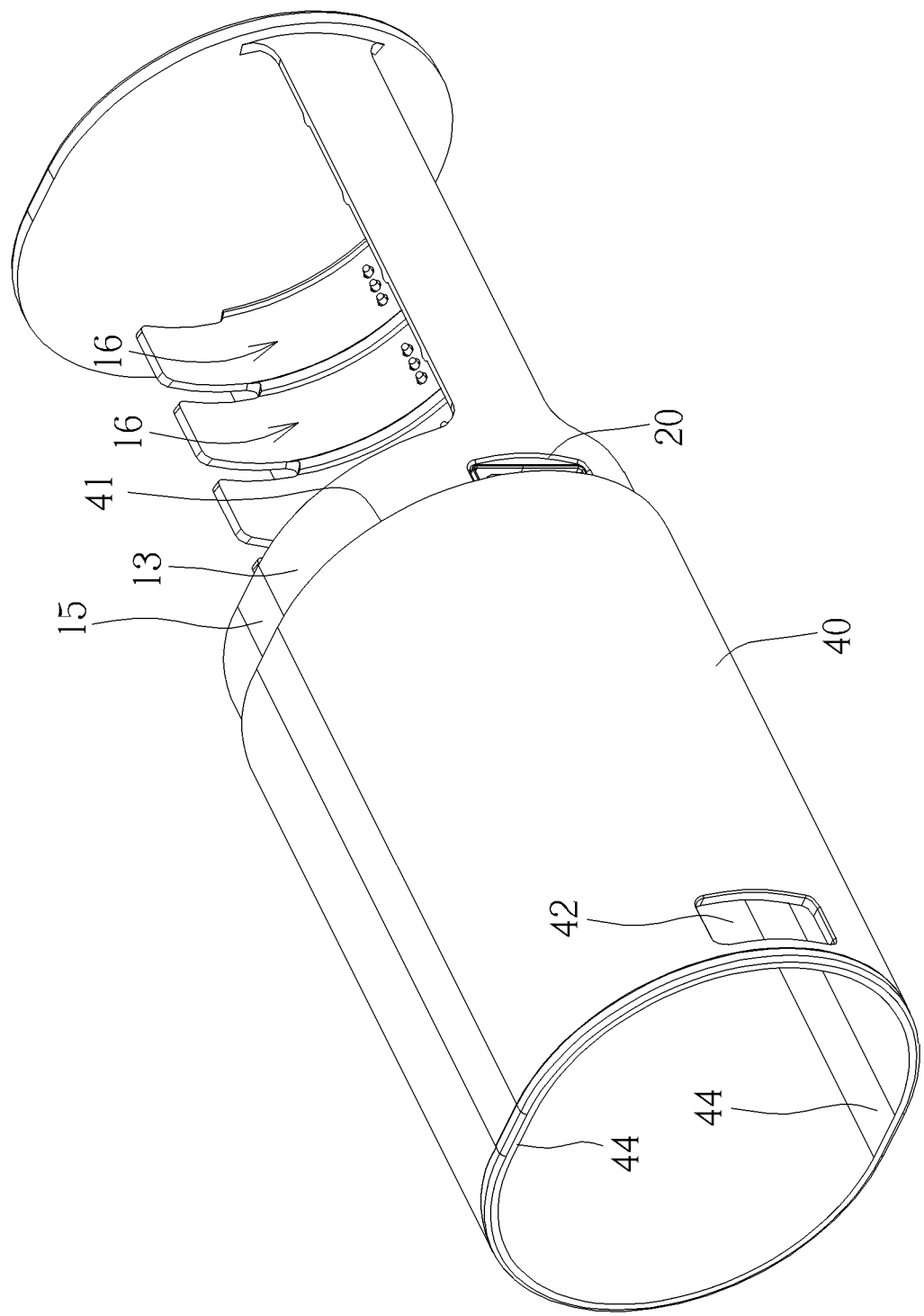
FIG. 10 is a perspective view of the station and the housing of the power bank shown in FIG. 1.
Figure 11:
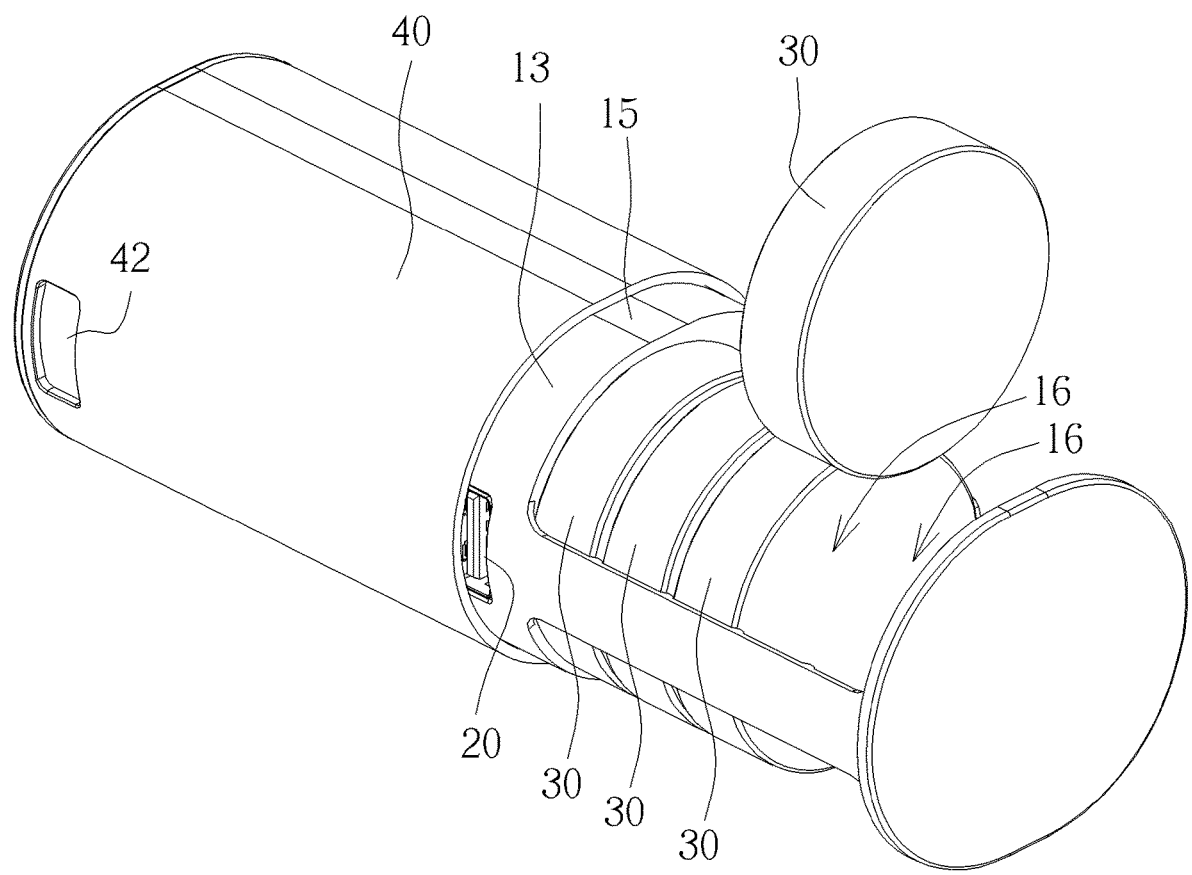
FIG. 11 is a perspective view of the station, the battery modules and the housing of the power bank shown in FIG. 1.

In another embodiment of the present invention, the power bank 10 further comprises a housing 40 for disposing and protecting the station 12. Please refer to FIG. 9 to FIG. 11. FIG. 9 is a perspective view of the housing 40 of the power bank 10. FIG. 10 is a perspective view of the station 12 and the housing 40 of the power bank 10. FIG. 11 is a perspective view of the station 12, the battery modules 30 and the housing 40 of the power bank 10. The housing 40 has a first opening 41 and a second opening 42. The station 12 can insert into the housing 40 through the first opening 41. When the station 12 is inserted into the housing 40, the position of the main discharging port 20 corresponds to the second opening 42. The upper side and the lower side of the housing 40 have guiding strips 44, and the upper and lower sides of the housing 13 have guiding grooves 15. When the station 12 inserts into the housing 40 through the first opening 41, the guiding groove 15 abuts the guiding strip 44 to guide the station 12 into the housing 40. Therefore, the guiding strip 44 and the guiding groove 15 can be used as a fool-proof structure, and the user can avoid placing the station 12 in the housing 40 in a wrong manner. In the present embodiment, the housing 40 is substantially a hollow cylinder and has a second opening 42. Therefore, when the station 12 is disposed in the housing 40, the main charging port 18 and the main discharging port 20 are not covered by the housing 40. Therefore, the user can still connect the main charging port 18 and the main discharging port 20 via a signal cable (such as an USB cable or a power cable) to use the power bank 10.

Figure 12:
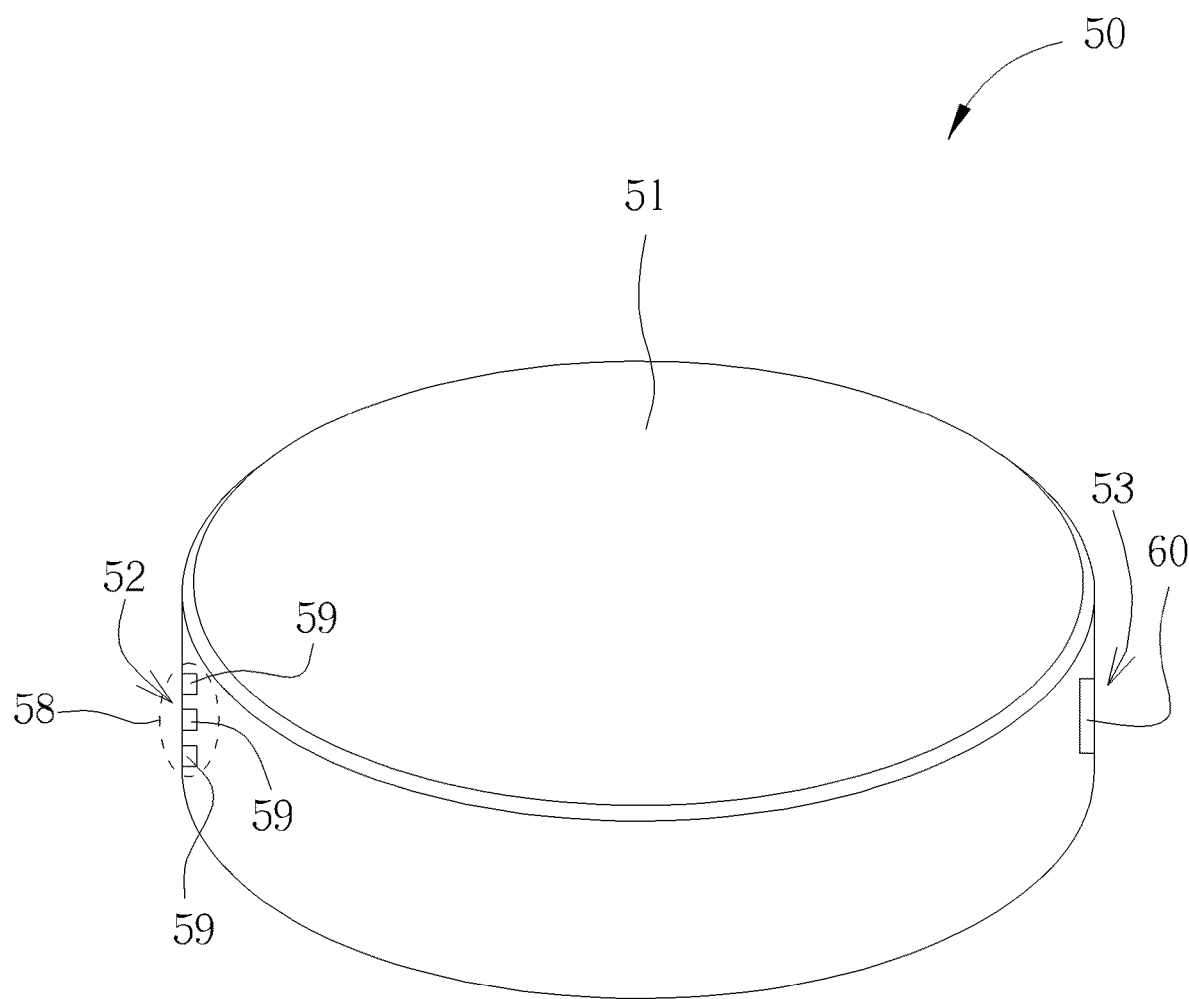
FIG. 12 is a perspective view of a power bank according to another embodiment of the present invention.
Figure 13:
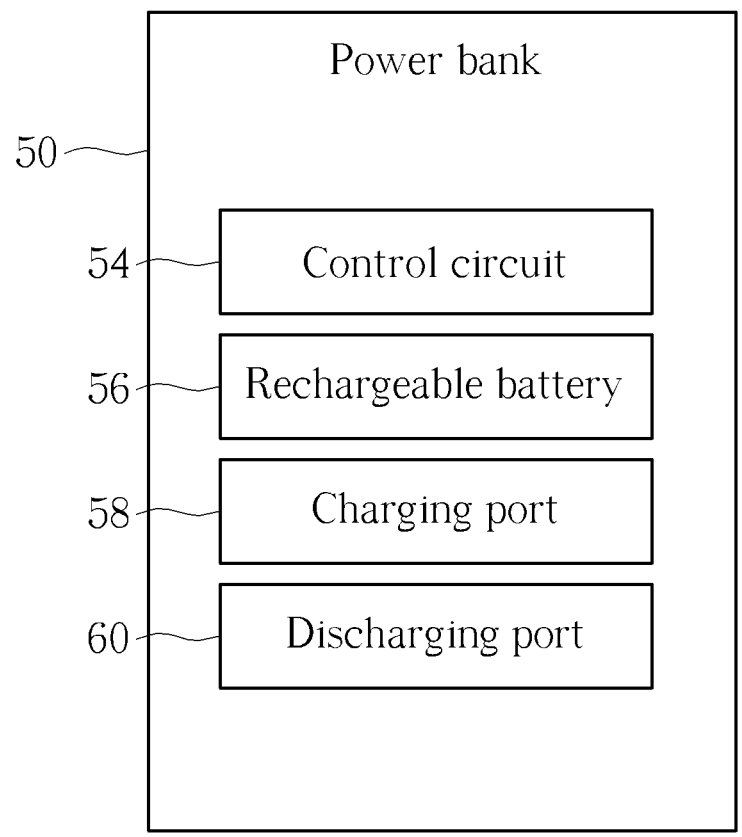
FIG. 13 shows the functional block diagram of the power bank shown in FIG. 12.

Please refer to FIG. 12 and FIG. 13. FIG. 12 is a perspective view of a power bank 50 according to another embodiment of the present invention. FIG. 13 shows a functional block diagram of the power bank 50 shown in FIG. 12. The power bank 50 has a cylindrical housing 51, a control circuit 54, a rechargeable battery 56, a charging port 58, and a discharging port 60. The control circuit 54 is disposed in the housing 51 and configured to control the operations of the power bank 50. The rechargeable battery 56 is disposed in the housing 51 and electrically connected to the control circuit 54 for storing electric energy. The charging port 58 is exposed from the first opening 52 of the housing 51 and electrically connected to the control circuit 54. When the charging port 58 is electrically connected to the power supply, the control circuit 54 charges the rechargeable battery 56 with the electric power received from the power supply. The discharging port 60 is exposed from the second opening 53 of the housing 51 and electrically connected to the control circuit 54. When the discharging port 60 is electrically connected to an external electronic device, the control circuit 54 supplies electric power of the rechargeable battery 56 to the electronic device via the discharging port 60. In an embodiment of the present invention, the charging port 58 may have a plurality of pogo pins 59 for electrically connecting to an external power supply. The discharging port 60 may be a universal serial bus (USB) port. In addition, the rechargeable battery 56 can have a rated capacity of 300 mAh (milliampere hours) to 500 mAh, which makes the power bank 50 easily portable.

In view of the foregoing embodiments, since each of the battery modules is disposed in a corresponding slot of the station in a pluggable manner, the user may dispose an appropriate number of battery modules in the slots of the station of the power bank according to actual needs. In addition, the present invention also provides a pancake-shaped power bank with a smaller rated capacity for convenient carrying.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A power bank, comprising:
   a station, comprising:
   a first housing, having a base and a plurality of slots;
   a charging-discharging control circuit;
   a main charging port, positioned in the base and electrically connected to the charging-discharging control circuit;
   a main discharging port, positioned in the base and electrically connected to the charging-discharging control circuit; and
   a plurality of first charging-discharging ports, electrically connected to the charging-discharging control circuit, and each of the first charging-discharging ports being positioned in a corresponding slot; and
   a plurality of battery modules, each of the battery modules being removably positioned in a corresponding slot and comprising:
   a second housing;
   a rechargeable battery, positioned in the second housing; and
   a second charging-discharging port, positioned at one side of the second housing, and electrically connected to the rechargeable battery, wherein when the battery modules are positioned in the slots, the second charging-discharging port of each battery module is electrically connected to a corresponding first charging-discharging port, and the battery modules are electrically connected in parallel;
   wherein when the main charging port is electrically connected to a power supply, the charging-discharging control circuit receives electric power from the power supply via the main charging port and charges rechargeable batteries of the battery modules via the first charging-discharging ports of the station and second charging-discharging ports of the battery modules;
   wherein when the main discharging port is electrically connected to an electronic apparatus, the charging-discharging control circuit provides electric power to the electronic apparatus via the main discharging port.

2. The power bank of claim 1, wherein when the main discharging port is electrically connected to the electronic apparatus, the charging-discharging control circuit receives electric power from the rechargeable batteries of the battery modules and provides the electric power received from the rechargeable batteries to the electronic apparatus via the main discharging port.

3. The power bank of claim 1 further comprises a third housing for disposing the station, the third housing having a first opening and a second opening, wherein the station is capable of inserting into the third housing through the first opening, and the main discharging port is adjacent to the second opening when the station is disposed in the third housing.

4. The power bank of claim 1, wherein the main charging port and the main discharging port are universal serial bus (USB) ports.

5. The power bank of claim 1, wherein each of the first charging-discharging ports comprises a plurality of pogo pins for electrically connecting to a corresponding second charging-discharging port.

6. The power bank of claim 1, wherein the second housing of each battery module has a cylindrical shape.

* * * * *